United States Patent [19]

Fabricius

[11] Patent Number: 5,298,378
[45] Date of Patent: Mar. 29, 1994

[54] PHOTOGRAPHIC ELEMENTS WITH REDUCED PRINT-THROUGH

[75] Inventor: Dietrich M. Fabricius, Hendersonville, N.C.

[73] Assignee: E. I. Du Pont de Nemours and Company, Wilmington, Del.

[21] Appl. No.: 39,571

[22] Filed: Mar. 19, 1993

Related U.S. Application Data

[63] Continuation-in-part of Ser. No. 811,771, Dec. 20, 1991.

[51] Int. Cl.$^5$ .................. G03C 1/815; G03C 1/825
[52] U.S. Cl. .................................. 430/510; 430/517; 430/519; 430/559; 430/507
[58] Field of Search ............. 430/561, 517, 519, 507, 430/559

[56] References Cited

U.S. PATENT DOCUMENTS

| | | | |
|---|---|---|---|
| 4,298,676 | 11/1981 | Barton et al. | 430/519 |
| 4,559,296 | 12/1985 | Bergthaller et al. | 430/561 |
| 4,621,156 | 11/1986 | Barton et al. | 564/250 |

FOREIGN PATENT DOCUMENTS

| | | |
|---|---|---|
| 0126324 | 5/1983 | European Pat. Off. |
| 1118422 | 10/1954 | France |
| 2111697 | 10/1971 | France |
| 114283 | 3/1926 | Switzerland |

OTHER PUBLICATIONS

Chemical Abstracts, vol. 69 No. 18, Oct. 28 1968, Columbus, Ohio, US:77216g.
Chemical Abstracts, vol. 87, No. 1, Jul. 4 1977, Columbus, Ohio, US:1048e.
Chemical Abstracts, vol. 76, No. 24, Jun. 12 1972, Columbus, Ohio, US;153700x.
Patent Abstracts of Japan, vol. 11 No. 85 (C-410) Mar. 14 1987 & JP,A,61 236 861 (Nippon Kagaku Kogyosho, K. K.) Oct. 22 1986.

*Primary Examiner*—Charles L. Bowers, Jr.
*Assistant Examiner*—Geraldine Letscher

[57] ABSTRACT

A photographic element is detailed which provides for improved resolution by decreasing the blue and ultraviolet radiation typically associated with internal scatter and print-through. These and other improvements are provided in a photographic element comprising a support having thereon at least one hydrophilic colloid layer, wherein at least one said hydrophilic colloid layer comprises a radiation sensitive silver halide emulsion layer, at least one said hydrophilic colloid layer comprises a filter dye consisting essentially of a compound with generic formula:

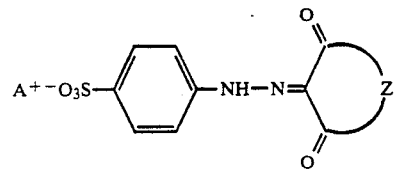

wherein:

A represents a counterion chosen from the set consisting of lithium, sodium, potassium, ammonium and alkylammonium of 1 to 15 carbons;

Z represents the atoms chosen from the group consisting of carbon, sulfur, nitrogen, oxygen and selenium necessary to form an optionally substituted ring.

7 Claims, No Drawings

PHOTOGRAPHIC ELEMENTS WITH REDUCED PRINT-THROUGH

RELATED APPLICATIONS

This application is a continuation-in-part of U.S. patent application Ser. No. 07/811,771 filed Dec. 20, 1991.

FIELD OF THE INVENTION

This invention relates to photographic silver halide emulsions and specifically to emulsions which contain filter dyes for improved resolution. This invention relates more specifically to photographic emulsions which contain diketo azo filter dyes.

BACKGROUND OF THE INVENTION

It is well known in the art of photographic science to add dyes to the structure of a photographic element in such a way as to absorb light from different regions of the electromagnetic spectrum. These dyes can be used to inhibit light from reaching a spectrally sensitized emulsion by a number of means including, but not limited to, being situated between the exposing source and the spectral sensitive emulsion. This method is typically employed in the art of color photography to ensure proper color balance as illustrated, for example, in *Research Disclosure*, No. 308, December 1989, Item 308119. Photographic elements are also known in which the filter dye is situated in such a manner as to absorb light which has passed through a spectrally sensitized emulsion layer. Exemplary examples of this application are presented when the dyes are used in underlayer or backing layer as illustrated, for example, in *Research Disclosure*, No. 308, December 1989, Item 308119. Photographic elements are also known in the art which utilize a filter dye, as exemplified by C-1, within the bounds of a photosensitive silver halide layer. Dyes within the bounds of the photosensitive absorb radiation which is scattered within the layer as well as radiation which exits the layer. The radiation which exits the emulsion is referred to in the art as print-through radiation. These prior art dyes are deficient due to the excessive loss of speed which occurs when the dyes are utilized within the bounds of the photographic layer.

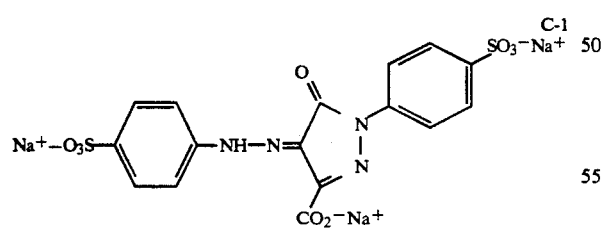

The fundamental properties of any said filter dye include, but are not limited to, (a) an ability to wash out or bleach during processing to insure that residual color is not imparted to the final image and (b) photographic inactivity such that no adverse sensitometric effects are observed such as fog or desensitization.

Through diligent efforts a new class of diketo azo filter dyes have been discovered which have excellent photographic properties and can be utilized in any of the photographic structures currently known in the art.

SUMMARY OF THE INVENTION

A photographic element is detailed which provides for improved resolution by decreasing the blue and ultraviolet radiation typically associated with internal scatter and print-through. These and other improvements are provided in a photographic element comprising a support having thereon at least one hydrophilic colloid layer, wherein at least one said hydrophilic colloid layer comprises a radiation sensitive silver halide emulsion layer, at least one said hydrophilic colloid layer comprises a filter dye consisting essentially of a compound with generic formula:

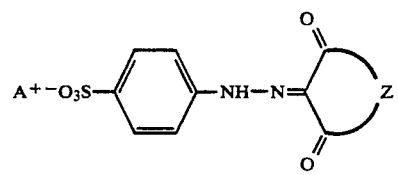

wherein:
A represents a counterion chosen from the set consisting of lithium, sodium, potassium, ammonium and alkylammonium of 1 to 15 carbons;
Z represents the atoms chosen from the group consisting of carbon, sulfur, nitrogen, oxygen and selenium necessary to form an optionally substituted five or six-membered ring.

This invention is further characterized by the applicability in medical x-ray imaging systems as provided in a radiographic element comprising at least one x-ray intensifying screen in operative association with a photographic element wherein said photographic element comprises
a support
at least one hydrophilic colloid layer coated on said support,
wherein at least one said hydrophilic colloid layer comprises a photosensitive layer,
wherein said photosensitive layer comprises silver halide grains and at least one filter dye represented by the generic formula:

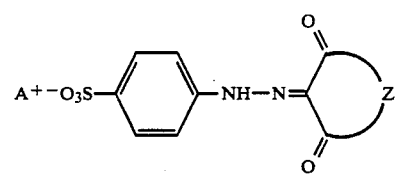

wherein:
A = counterion chosen from the set consisting of lithium, sodium, potassium, ammonium and alkylammonium of 1 to 15 carbons;
Z = atoms chosen from the group consisting of carbon, sulfur, nitrogen, oxygen and selenium necessary to form an optionally substituted five or six-membered ring.

DETAILED DESCRIPTION OF THE INVENTION

A class of diketo diazo dyes incorporated into silver halide photosensitive emulsion according to the teaching herein provides for reduced print-through when exposed with a blue or ultraviolet exposure source. The dyes of this invention can be described by the generic formula:

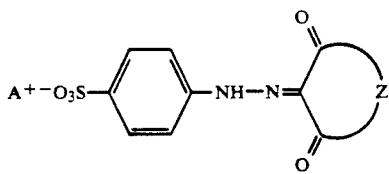

wherein:
- A = counterion chosen from the set consisting of lithium, sodium, potassium, ammonium and alkylammonium of 1 to 15 carbons;
- Z = atoms chosen from the group consisting of carbon, sulfur, nitrogen, oxygen and selenium necessary to form an optionally substituted five or six-membered ring.

The five or six-membered ring may be broadly described provided the above mentioned photographic properties are not compromised. The ring may be substituted of unsubstituted. Ring substitution may be broadly used with the proviso that the substituent does not adversely affect photographic sensitivity. Particularly preferred substituents include halogens, alkyl of 1 to 20 carbons, alkenyl of 2 to 20 carbons, aryl of 6 to 20 carbons, akylaryl of 7 to 21 carbons, hydroxy, alkoxy of 1 to 10 carbons, alkyl amine of 1 to 10 carbons, thiol and alkyltihiol of 1 to 10 carbons.

Particularly preferred compounds are obtained when Z is chosen from the set consisting of:

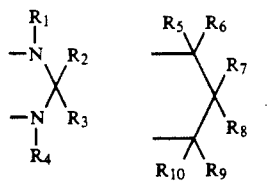

wherein R1, R2, R3 and R4 independently represent a hydrogen atom, an alkyl of 1 to 20 carbons, an aryl of 6 to 20 carbons, an arylalkyl of 7 to 21 carbons; taken in suitable pairs R1, R2, R3 and R4 may represent the elements necessary to form a cyclic alkyl of 5 to 7 carbons or a cyclic aryl of 6 to 20 carbons, R2 and R3 may be taken together to represent a ketone, thione, imine or imine substituted with alkyl of 1 to 20 carbons, aryl of 6 to 20 carbons, alkylaryl of 7 to 21 carbons, hydroxy, alkoxy of 1 to 10 carbons; wherein R5, R6, R7, R8, R9 and R10 independently represent a hydrogen atom, an alkyl of 6 to 20 carbons, an aryl of 6 to 20 carbons, an arylalkyl of 7 to 21 carbons; taken in suitable pairs R5, R6, R7, R8, R9 and R10 may represent the elements necessary to form a cyclic alkyl of 5 to 7 atoms or a cyclic aryl of 6 to 20 carbons, R7 and R8 may be taken together to represent a ketone, thione, imine or imine substituted with alkyl of 1 to 20 carbons, aryl of 6 to 20 carbons, alkylaryl of 7 to 21 carbons, hydroxy, alkoxy of 1 to 10 carbons.

Examples of rings structures within the teachings of the invention are cycloalkyl of 5 to 7 carbons, cycloalkenyl of 5 to 7 carbons, indoles, piperidine, piperidyl, piperazinyl, pyrrolidine, pyrrolidinyl, pyrazolidine, pyrimidine, furan, thiophene, oxazine and the like. Specifically suitable moieties are derived from the following nuclei which may be additionally substituted if so desired: 1,3-indandione, pyrazolone, 2,4,6,-trioxohexahydropyrimidine, 2-thio-4,6,dioxohexahydropyrimidine, 3,5-pyrazolidinedione, 5,7-dioxo-6,7-dihydro-5-thiazolo[3,2-a]pyrimidine, 2-thio-2,4-oxazolidinedione, 5,5-dialkyl-1,3-cylcohexanedione wherein alkyl comprise 1 to 10 carbons, 2-hydroxy-4H-pyrido[1,2-a]pyrimidin-4-one and the like.

The terms alkyl, aryl, akylaryl, cyclic alkyl and cylic aryl refer to both substituted and unsubstituted as known in the art.

Specific exemplary examples of the generic formula are provided below. These examples are not intended to limit in any way the teachings herein.

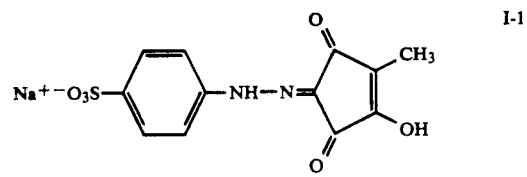

I-1

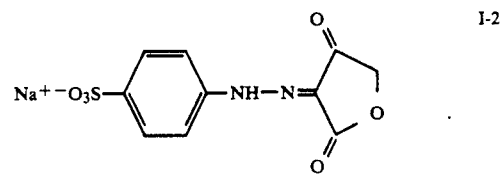

I-2

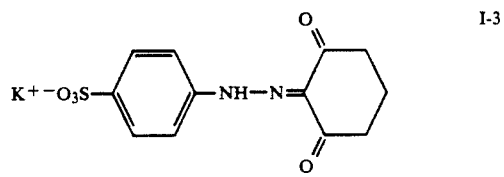

I-3

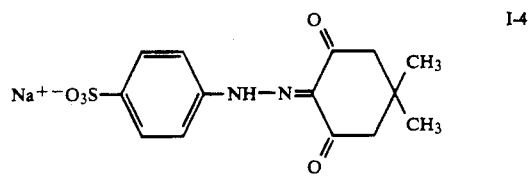

I-4

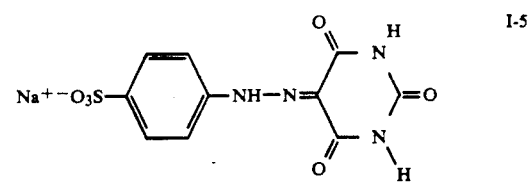

I-5

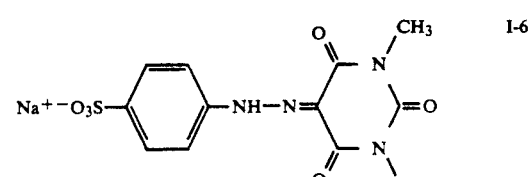

I-6

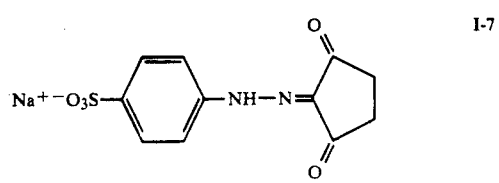

I-7

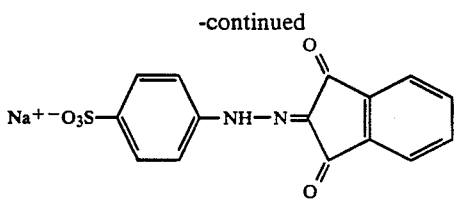

I-8

The dyes of this invention may be dissolved in any of a host of suitable solvents including methanol, ethanol or water. These dyes can be added as a concentrated slurry in the aforementioned solvents to a hydrophilic colloid solution anytime prior to coating. Preferred is addition into the photosensitive emulsion as a solution. Time of addition is typically not critical. The dyes can be added at any time during the preparation of the grains, prior to or after the addition of gold and sulfur salts or after chemical sensitization is complete. Most preferable is addition after chemical sensitization is complete. The dyes are typically provided in an amount in the range 50 to 4000 mg of dye per mole of silver and preferably from 200 to 2000 mg of dye per mole of silver.

The invention discribed herein may be used in any methods known in the art for filter days. These methods include but are not limited to use in a layer separate from the emulsion such as in the use of overcoats, underlayers and backing layers or the dye may be used within the bounds of the photosensitive emulsions itself.

Any of the conventional halides may be used but we prefer pure silver bromide or silver bromide with small amounts of iodide incorporated therein (e.g. 98% Br and 2% I by weight for example). Any grain morphology is suitable for demonstration of these teachings including, but not limited to, grains which are formed by splash techniques and those formed by techniques involving spray techniques. Tabular grains as taught by Nottorf, U.S. Pat. No. 4,722,886 or Ellis, U.S. Pat. No. 4,801,522 are most preferred.

The grains are preferably dispersed in a binder (e.g. gelatin or other well-known binders such as polyvinyl alcohol, phthalated gelatins, etc.). In place of gelatin other natural or synthetic water-permeable organic colloid binding agents known in the art can be used as a total or partial replacement thereof. It is common to use binder adjuvants useful for increasing covering power such as dextran or the modified, hydrolysed gelatins of Rakoczy, U.S. Pat. No. 3,778,278.

It is most preferable to chemically sensitize the grain with salts that are well known in the art. The most common sensitizers are salts of gold or sulfur. Sulfur sensitizers include those which contain labile sulfur, e.g. allyl isothiocyanate, allyl diethyl thiourea, phenyl isothiocyanate and sodium thiosulfate for example. The polyoxyalkylene ethers in Blake et al., U.S. Pat. No. 2,400,532, and the polyglycols disclosed in Blake et al., U.S. Pat. No. 2,423,549. Other non-optical sensitizers such as amines as taught by Staud et al., U.S. Pat. No. 1,925,508 and Chambers et al., U.S. Pat. No. 3,026,203, and metal salts as taught by Baldsiefen, U.S. Pat. No. 2,540,086 may also be used. Spectral sensitization can also be employed to render the emulsion most sensitive to specific colors. The methods are well known in the art and include, but are not limited to, cyanines, merocyanines, oxonols, hemioxonols, styryls, merostyryls, complex cyanines and merocyanines (i.e. tri-, tetra-, and polynuclear cyanines and merocyanines), and streptocyanines as illustrated in *Research Disclosure*, No. 308, December, 1989, Item 308119.

The emulsions can contain known antifoggants, e.g. 6-nitrobenzimidazole, benzotriazole, triazaindenes, etc., as well as the usual hardeners, i.e., chrome, alum, formaldehyde, dimethylol urea, mucochloric acid, etc. Other emulsion adjuvants that may be added comprise matting agents, plasticizers, toners, optical brightening agents, surfactants, image color modifiers, other previously known print-through reduction dyes, and covering power adjuvants among others.

The film support for the emulsion layers used in the novel process may be any suitable transparent plastics. For example, the cellulosic supports, e.g. cellulose acetate, cellulose triacetate, cellulose mixed esters, etc. may be used. Polymerized vinyl compounds, e.g., copolymerized vinyl acetate and vinyl chloride, polystyrene, and polymerized acrylates may also be mentioned.

When polyethylene terephthalate is manufactured for use as a photographic support, it is preferable to use a mixed polymer subbing composition such as that taught by Rawlins, U.S. Pat. No. 3,567,452, Miller, U.S. Pat. Nos. 4,916,011 and 4,701,403, Cho, U.S. Pat. Nos. 4,891,308 and 4,585,730 and Schadt, U.S. Pat. No. 4,225,665. Upon completion of stretching and application of subbing composition, it is necessary to remove strain and tension in the base by a heat treatment comparable to the annealing of glass.

The emulsions may be coated on the supports mentioned above as a single layer or multi-layer element. For medial x-ray applications, for example, layers may be coated on on both sides of the support which conventionally contains a dye to impart a blue tint thereto. Contiguous to the emulsion layers it is conventional, and preferable, to apply a thin stratum of hardened gelatin supra to said emulsion to provide protection thereto.

The emulsions of this invention can be used in any of the conventional photographic systems (e.g. negative or positive-working systems). Thus, they can contain any of the adjuvants related to the particular system employed. For example, the emulsions when employed as direct positive may be chemically fogged using metals sush as rhodium or iridium and the like, or with other chemical fogging agents such as boranes, as well-known to those skilled in the art.

The teachings provided herein are particularly useful in combination with x-ray intensifying screens. Preferred are screens which emit in the blue or ultraviolet region of the electromagnetic spectrum. An ultra-violet emitting screen is typically defined as having a peak emission which is substantially less than about 450 nm and preferably a ultra-violet emitting screen, when struck by X-radiation has a peak emission between 300 and 390 nm. A particularly preferred x-ray intensifying screen is provided by Brixner, U.S. Pat. No. 4,225,653 which teaches screens comprising a phosphor which is selected from the group consisting of:

(a) $YNb_xTa_{1-x}O_4$, where x is 0 to about 0.15;
(b) $LuNb_xTa_{1-x}O_4$, where x is 0 to about 0.2;
(c) $Y_{1-y}Tm_yTaO_4$, where y is 0 to about 0.03;
(d) a solid solution of (a) and (b);
(e) a solid solution of (a) and (c);
(f) $Y_{1-y}Tb_yTaO_4$, where y is about 0.001 to about 0.15;
(g) $Lu_{1-y}Tb_yTaO_4$, where y is about 0.001 to about 0.15;
(h) $Gd_{1-y}Tb_yTaO_4$, where y is about 0.001 to about 0.15;
(i) a solid solution of at least two of (f), (g) and (h);

(j) any of (a) to (i) wherein up to 45 mole percent of the yttrium, lutetium or gadolinium is replaced by lanthanum;

(k) any of (a) to (i) wherein up to 15 mole percent the yttrium, lutetium or gadolinium is replaced by ytterbium; and (l) any of (a), (b), (c), (d) and (e) wherein up to 15 mole percent of the yttrium or lutetium is replace by gadolinium.

DYE PREPARATION PROCEDURES

Synthesis of I-4

Ten ml of concentrated HCl was diluted with 26 ml water and mixed with 5.19 g sulfanilic acid. The resulting mixture was cooled to 0° C. before adding 2.1 g sodium nitrite discolored in 5 ml water. The addition rate was controlled to maintain a reaction temperature below 5° C. The resulting slurry of precipitated diazonium salt and water was treated with urea until potassium iodide paper tested negative (no color). 5,5-Dimethyl-1,3-cyclohexanedione, 4.21 g, was slurried with 50 ml of water. After cooling to 0° C., 4.79 g sodium hydroxide in 10 ml of water was added. The resulting solution was stirred and cooled to <5° C. while adding the diazonium salt slurry dropwise. When addition of diazonium salt was complete, the ice bath was removed and the reaction mixture allowed to warm and stir at room temperature for one hour. The solution was saturated with sodium chloride and the precipitated dye collected by filtration. The dye was dissolved in methanol, the undissolved salts removed by filtration, and the filtrate concentrated by rotary evaporation. The residue was slurried in isopropanol and filtered to yield 13.08 g, mp 305° C., $\lambda_{max}$=385 nm ($\epsilon$=15,259), 245 nm ($\epsilon$=5907).

Synthesis of I-5

Ten ml of concentrated HCl was diluted with 26 ml water and mixed with 5.19 g sulfanilic acid. The resulting mixture was cooled to 0° C. before adding 2.1 g sodium nitrite dissolved in 5 ml water. The addition rate was controlled to maintain a reaction temperature below 5° C. The resulting slurry of precipitated diazonium salt and water was teated with urea until potassium iodide paper tested negative (no color). Barbituric acid, 3.84 g, was slurried with 50 ml of water. After cooling to 0° C., 4.79 g sodium hydroxide in 10 ml of water was added. The resulting solution was stirred and cooled to <5° C. while adding the diazonium salt slurry dropwise. When addition to diazonium salt was complete, the ice bath was removed and the pH was adjusted to 8 with dilute sodium hydroxide. The reaction mixture allowed to warm and stir at room temperature for two hours. After acidification, the precipitated dye collected by filtration. The dye was slurried in isopropanol overnight, filtered, and vacuum dried to yield 9.39 g, mp >350° C., $\lambda_{max}$=385 nm ($\epsilon$=32,000), 230 nm ($\epsilon$=11,000).

Synthesis of I-6

Ten ml of concentrated HCl was diluted with 25 ml water and mixed with 5.19 g sulfanilic acid. The resulting mixture was cooled to 0° C. before adding 2.1 sodium nitrite dissolved in 5 ml water. The addition rate was controlled to maintain a reaction temperature below 5° C. The resulting slurry of precipitated diazonium salt and water was treated with urea until potassium iodide paper tested negative (no color). 1,3-Dimethylbarbituric acid, 4.68 g, was slurried with 50 ml of water. After cooling to 0° C., 4,79 g sodium hydroxide in 10 ml of water was added. The resulting solution was stirred and cooled to <5° C. while adding the diazonium salt slurry dropwise. When addition of diazonium salt was complete, the ice bath was removed. The reaction mixture allowed to warm room temperature for one hour. After acidification and filtration, the filtrate was saturated with sodium chloride and then warmed to precipitate the dye. The precipitated dye was collected by filtration to yield 11.58 g, mp 340° C. (dec), $\lambda_{max}$=385 nm ($\epsilon$=23,000), 230 nm ($\epsilon$=8200).

Synthesis of I-7

Ten ml of concentrated HCl was diluted with 25 ml water and mixed with 5.19 g sulfanilic acid. The resulting mixture was cooled to 0° C. before adding 2.1 g sodium nitrite dissolved in 5 ml water. The addition rate was controlled to maintain a reaction temperature below 5° C. The resulting slurry of precipitated diazonium salt and water was treated with urea until potassium iodide paper tested negative (no color). 1,3-Cyclopentanedione, 2.94 g, was slurried with 50 ml of water. After cooling to 0° C., 5.00 g sodium hydroxide in 10 ml of water was added. The resulting solution was stirred and cooled to <5° C. while adding the diazonium salt slurry dropwise. When addition of diazonium salt was complete, the ice bath was removed. The pH was adjusted to 8 and reaction mixture allowed to warm to room temperature for two hours. The solution was saturated with sodium chloride to precipitate the dye. The dye was collected by filtration to yield 7.02 g, mp>350° C., $\lambda_{max}$=395 nm ($\epsilon$=25,000), 240 nm ($\epsilon$=10,000).

Synthesis of I-3

I-3 was prepared as described for I-7 from 3.36 g 1,3-cyclohexanedione. After addition of diazonium salt was complete, the reaction mixture allowed to warm to room temperature. The solution was acidified, saturated with sodium chloride, and treated with isopropanol to reprecipitate the inorganic salts. After filtration, the filtrate was rotary evaporated and residue treated with methanol and isopropanol. The resulting particles were removed by filtration and filtrate treated with potassium acetate in methanol to precipitate 5.77 g of dye, mp 145° C., $\lambda_{max}$=385 nm ($\epsilon$=10,000), 245 nm.

Synthesis of I-2

I-2 was prepared as described for I-7 from 3.00 g tetronic acid. After addition of diazonium salt was complete, the reaction mixture was adjusted to basic pH and allowed to warm to room temperature. The solution was acidified, cooled with ice, and filtered to yield 5.68 g of dye, mp>350° C., $\lambda_{max}$=375 nm ($\epsilon$=20,000), 230 nm ($\epsilon$=9,000).

SCREEN SAMPLES

Screen A is a standard LaOBr:Tm predominantly blue emitting screen which is commercially available from DuPont (Wilmington, Del.). Screen B is a standard YTaO$_4$:NB predominantly blue emitting screen prepared as described in Brixner, U.S. Pat. No. 4,225,653 which is included herein by reference thereto. Screen C is a predominantly UV emitting YTaO$_4$ screen prepared by the procedure as described in Brixner and further elaborated below:

A. The Binder Solution:
The following ingredients were prepared:

| Ingredient | Amount (g) |
|---|---|
| n-Butyl acetate | 43.13 |
| n-Propanol | 34.00 |
| Carboset 525 (1) | 10.00 |
| Carboset 526 (2) | 10.00 |
| Polymeric organic silicone fluid | 0.07 |
| Zelec 2457E (3) | 0.40 |
| Aerosol OT-100 (4) | 0.40 |
| Pluronic 31R1 (5) | 2.00 |

(1) Acrylic resin; ave. mol. wt. 260,000; acid no. 76–85; B. F. Goodrich Co., Cleveland, OH
(2) Acrylic resin; ave. mol. wt. 200,000; acid no. 100; B. F. Goodrich Co., Cleveland, OH
(3) Anionic antistatic agent of mixed mono and dialkylphosphates of the general structure R2HPO4, where R is C8 to C10 alkyl; E. I. du Pont de Nemours & Co., Wilmington, DE
(4) Sodium dioctyl sulfosuccinate per U.S. Pat. No. 2,441,341
(5) Ethylene oxide/propylene oxide block copolymer; ave. mol. wt. 3,200; BASF Wyandotte; Wyandotte, MI

B. The X-ray Phosphor:
The following ingredients were thoroughly mixed in a paint dshaker for about 2 hours before charging to a alumina crucible:

| Ingredient | Amount (g) |
|---|---|
| Y2O3 | 101.46 |
| Ta2O5 | 198.54 |
| Li2SO4 | 150.00 |

The crucible was then placed in a standard, commercial, high temperature furnace and fired at about 1200° C. for about 8 hours and then at about 1250° C. for about 16 hours. The furnace was then allowed to cool and the contents of the crucible weighed and washed thoroughly with water to remove the unreacted salts and flux. This material was then added to the binder from above using about 200 g of phosphor/60 g of binder solution. This material was placed in a plastic container along with about 85 g of 3.8 in. diameter corundum balls (ca. 15 balls) and this mixture was then ball milled for about 12 to 16 hours at room temperature with a rotation speed of about 60 rpm. After this step, the ball milled suspension was filtered through a 75 mesh Nylon bag and coated onto a suitable support.

The support used was 0.010 inch thick, dimensionally stable polyethylene terephthalate film containing a small amount of a whitener (e.g., anatase TiO2) dispersed therein. This whitener will give the support some opacity to visible light (e.g. optical density of ca. >1.7). The coating weight of the phosphor dispersion placed thereon is about 100 mg of phosphor per cm2.

C. The Overcoat Layer:
An overcoat layer is prepared from the following solutions:

| 1) Ingredient | Amount (g) |
|---|---|
| Acetone | 67.00 |
| Methanol | 9.00 |
| n-Butyl acetate | 4.80 |
| Tyril* 100 (1) | 12.70 |
| Carboset* XL-27 (2) | 9.00 |

(1) Styrene/acrylonitrile copolymer resin; Dow Chemical Co., Midland, MI
(2) Acrylic resin; ave. mol. wt 30,000; acid no. 80, B. F. Goodrich Co., Cleveland, OH A gel solution is prepared by mixing the following ingredients until a thick gel forms:

| 2) Ingredient | Amount (g) |
|---|---|
| Methanol | 14.70 |
| Triamylamine | 0.20 |
| Carbopol* 1342 (1) | 0.132 |

(1) Acrylic resin thickener; B. F. Goodrich Co., Cleveland, OH

This solution is filtered and a mixture is prepared as follows:

| 3) Ingredient | Amount (g) |
|---|---|
| Solution 1 | 50.00 |
| Gel Solution 2 | 12.19 |

This mixture is coated on top of the phosphor coating using a doctor knife with a 0.0004 in. gap. The resulting top-coat is air dried for 12–16 h at 40° C.

EMULSION EXAMPLES

A silver bromide tabular emulsion was made according to the teachings of Ellis, U.S. Pat. No. 4,801,522. After precipitation of the grains the average aspect ratio was determined to be about 5:1 and thickness of about 0.2 μm. These grains were dispersed in photographic grade gelatin (about 117 grams gelatin/mole of silver bromide) and a solution of 250 mg of sensitizing dye A and 161 mg tributylamine in 2.9 ml of methanol was added to achieve 150–217 mg of dye per mole of silver halide. At this point, the emulsion was brought to its

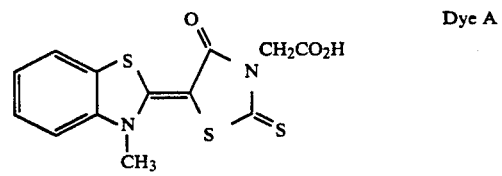

Dye A

3-Carboxymethyl-5-(3-methyl-2-benzothiazolylidene) rhodanine optimum sensitivity with gold and sulfur salts as is well-known to those skilled in the art. The emulsion was then stabilized by the addition of 4-hydroxy-6- methyl-1,3,3a,7-tetrazaindene and 1-phenyl-5-mercaptotetrazole. The usual wetting agents, antifoggants, coating aids, and hardeners were added. The compounds of this invention were then added as a methanol or aqueous solution. This emulsion was then coated on a dimensionally stable, 7 mil polyethylene terephthalate film support which had first been coated with a conventional resin sub followed by a thin substratum of hardened gelatin applied supra thereto. These subbing layers were present on both sides of the support. The emulsion was coated on one side at 2 g silver per square meter. A thin abrasion layer of hardened gelatin was applied over the emulsion layer. For control purposes, a similar emulsion was made without the compound of this invention. Samples of each of these coatings were given an exposure through a test target and a conventional step wedge to X-rays interacting with an X-ray intensifying screen and then developed in a conventional X-ray film processor. Print-through measurements were determined by coating an emulsion on only one side of a polyethylene support and exposing a second emulsion with Screen B wherein the emission of Screen B traversed the test emulsion and the support prior to impinging on the second emulsion. The second emulsion was then processed in a conventional manner and the density recorded. Evaluation of the samples are summarized as follows:

TABLE 1

SENSITOMETRIC RESPONSE WITH INVENTIVE DYES

| Sample | Dye | amt (g/mol AgBr) | Screen Speed A | Screen Speed B | print-through |
|---|---|---|---|---|---|
| 1 | — | — | 100 | 100 | 0.241 |
| 2 | C-1 | 0.53 | 86 | 81 | 0.212 |
| 3 | I-4 | 0.33 | 102 | 97 | 0.211 |
| 4 | I-4 | 0.67 | 93 | 86 | 0.208 |
| 5 | I-8 | 0.33 | 76 | 67 | 0.208 |
| 6 | I-8 | 0.67 | 61 | 53 | 0.199 |
| 7 | I-7 | 0.33 | 88 | 93 | 0.208 |
| 8 | I-7 | 0.67 | 84 | 77 | 0.193 |
| 9 | I-3 | 0.33 | 79 | 81 | 0.220 |
| 10 | I-3 | 0.67 | 65 | 64 | 0.224 |
| 11 | I-5 | 0.33 | 99 | 98 | 0.236 |
| 12 | I-5 | 0.67 | 89 | 86 | 0.215 |
| 13 | I-6 | 0.33 | 96 | 94 | 0.210 |
| 14 | I-6 | 0.67 | 97 | 88 | 0.212 |

The inventive examples provide for low print-through with less speed loss than the control dye in sample 2.

Example 2

The emulsion was prepared as in example 1, but additionally exposed with a uv-emitting Screen C.

TABLE 2

SENSITOMETRIC RESPONSE WITH INVENTIVE DYES

| Sample | Dye | amt (g/mol AgBr) | Screen Speed A | Screen Speed B | Screen Speed C | print-through |
|---|---|---|---|---|---|---|
| 15 | — | — | 100 | 100 | 100 | 0.235 |
| 16 | C-1 | 0.93 | 78 | 70 | 93 | 0.215 |
| 17 | C-1 | 1.07 | 83 | 70 | 101 | 0.210 |
| 18 | I-6 | 0.93 | 85 | 77 | 90 | 0.215 |
| 19 | I-6 | 1.07 | 83 | 74 | 91 | 0.202 |
| 20 | I-4 | 0.93 | 77 | 81 | 91 | 0.221 |
| 21 | I-4 | 1.07 | 73 | 79 | 95 | 0.201 |

These examples show that the inventive dyes exhibit a reduction in print-through with comparable speeds and without significant loss of speed in the ultraviolet region of the electromagnetic spectrum.

Example 3

An emulsion was prepared as in example 1, except that combinations of acutance dyes were added to the example.

TABLE 3

EFFECT OF COMBINATIONS OF INVENTIVE DYES AND ACUTANCE DYES

| Sample | Dye | amount (g/mol AgBr) | Screen Speed A | Screen Speed B | print-through |
|---|---|---|---|---|---|
| 22 | — | — | 100 | 100 | 0.229 |
| 23 | C-1 | 0.27 | 83 | 92 | 0.212 |
| 24 | C-1 | 0.53 | 79 | 80 | 0.213 |
| 25 | C-1 | 0.67 | 78 | 77 | 0.198 |
| 26 | C-1 | 0.93 | 74 | 66 | 0.186 |

TABLE 3-continued

EFFECT OF COMBINATIONS OF INVENTIVE DYES AND ACUTANCE DYES

| Sample | Dye | amount (g/mol AgBr) | Screen Speed A | Screen Speed B | print-through |
|---|---|---|---|---|---|
| 27 | C-1 | 1.2 | 76 | 66 | 0.191 |
| 28 | I-6 | 0.27 | 98 | 89 | 0.211 |
| 29 | I-6 | 0.67 | 92 | 81 | 0.212 |
| 30 | I-6 +C-1 | 0.67 0.27 | 82 | 74 | 0.185 |
| 31 | I-6 | 0.93 | 82 | 73 | 0.203 |
| 32 | I-6 +C-1 | 0.93 0.27 | 72 | 67 | 0.192 |
| 33 | I-6 | 1.2 | 82 | 67 | 0.195 |
| 34 | I-6 | 1.47 | 77 | 69 | 0.190 |

This example shows that compounds of this invention can be used in combination with acutance dyes such as C-1 to provide higher sensitivity with equivalent or greater print-through protection compared to usage of dyes like C-1 alone.

I claim:

1. A photographic element comprising at least one hydrophilic colloid layer wherein said hydrophilic colloid layer comprises a dye of the formula:

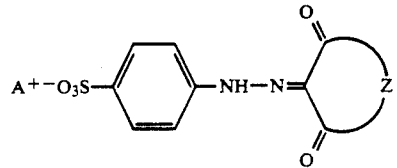

wherein:
A represents a counterion chosen from the set consisting of lithium, sodium, potassium, ammonium and alkylammonium of 1 to 15 carbons;
Z represents the atoms chosen from the group consisting of carbon, sulfur, nitrogen, oxygen and selenium necessary to form an unsubstituted or substituted five or six-membered ring.

2. A photographic element as recited in claim 1 further comprising a silver halide wherein said dye is present in the amount of 50 to 4000 mg of said dye per mole of said silver halide.

3. A photographic element as recited in claim 1 wherein said Z is chosen from the set consisting of:

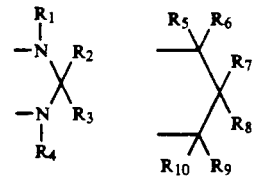

wherein R1, R2, R3 and R4 independently represent a hydrogen atom, an alkyl of 1 to 20 carbons, an aryl of 6 to 20 carbons, an arylalkyl of 7 to 21 carbons or taken in suitable pairs R1, r2, R3 and R4 represent the elements necessary to form a cyclic alkyl of 5 to 7 carbons or a cyclic aryl of 6 to 20 carbons or R2 and R3 taken together represent a ketone, thione, imine or imine substituted with alkyl of 1 to 20 carbons, aryl of 6 to 20 carbons, alkylaryl of 7 to 21 carbons, hydroxy, alkoxy of 1 to 10 carbons; or wherein R5, R6, R7, R8, R9 and R10 independently represent a hydrogen atom, an alkyl of 6 to 20 carbons, an aryl of 6 to 20 carbons, an arylalkyl of 7 to 21 carbons; or taken in suitable pairs R5, R6, R7, R8, R9 and R10 represent the elements necessary to form a cyclic alkyl of 5 to 7 atoms or a cyclic aryl of 6 to 20 carbons or R7 and R8 taken together to represent a ketone, thione, imine or imine substituted with alkyl of 1 to 20 carbons, aryl of 6 to 20 carbons, alkylaryl of 7 to 21 carbons, hydroxy, alkoxy of 1 to 10 carbons.

4. A photographic element as recited in claim 1 wherein said filter dye is chosen from the set consisting of:

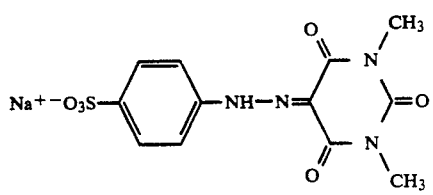

and

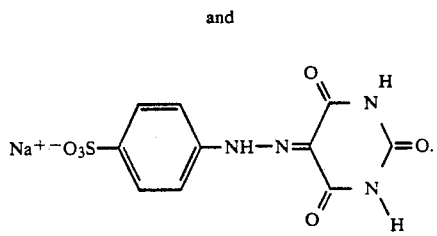

5. The photographic element as recited in claim 1 wherein said filter dye is chosen from the set consisting of:

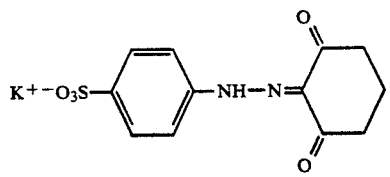

and

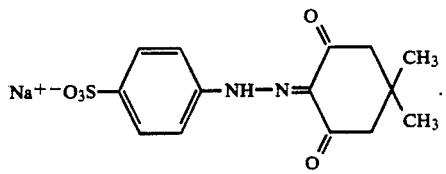

6. A photographic element as recited in claim 1 wherein said filter dye is

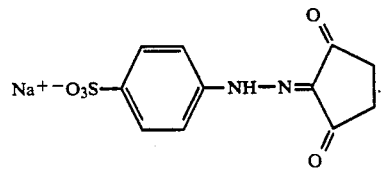

7. A photographic element as recited in claim 1 further comprising a radiographic intensifying screen.

* * * * *